United States Patent Office 3,691,038
Patented Sept. 12, 1972

3,691,038
PROCESS FOR THE RECOVERY OF ZINC FROM ZINC- AND IRON-CONTAINING MATERIALS
Adolf von Roepenack and Hans Wuetrich, Datteln, and Wilhelm Schmidt, Quellenkamp, Germany, assignors to Det Norske Zenkkompani A/S, Eitrheim, Odda, Norway
No Drawing. Filed Sept. 23, 1970, Ser. No. 74,895
Claims priority, application Germany, Sept. 25, 1969, P 19 48 411.8
Int. Cl. C22d 1/22; C22b 19/00
U.S. Cl. 204—119
9 Claims

ABSTRACT OF THE DISCLOSURE

A process for the recovery of zinc from materials, e.g. ores or concentrates and other substances containing zinc and iron, generally in the form of oxides, wherein the material is leached with excess hot sulfuric acid. The acidity of the extracts is reduced by adding zinc oxide or like zinc-containing oxidic materials to precipitate iron. The leaching is carried out at 95°–100° C. with a leaching solution containing 180–220 g./liter $H_2SO_4$. Leaching is continued until the sulfuric acid content is reduced to 20–60 g./liter $H_2SO_4$, whereupon the zinc-containing oxidic materials are added, preferably subsequent to the addition of alkali-metal and/or ammonium ions, at a temperature of 95°–100° C. to reduce the sulfuric acid concentration to less than 10 g./liter $H_2SO_4$.

(1) FIELD OF THE INVENTION

Our present invention relates to a method of recovering zinc from zinc-containing materials and particularly zinc-oxide materials which also may contain iron, i.e. in the form of the oxide, so that the zinc is effectively separated from the iron.

(2) BACKGROUND OF THE INVENTION

It has been proposed to separate zinc from iron or to recover zinc free from iron, starting with zinc and iron raw materials, preferably mixed oxides as arise from metallurgical processes, by several methods. For example, roasted zinc blende is an important starting material for the recovery of zinc, particularly using electrolytic methods. The toasted zinc blend contains, for example, 55–73% by weight zinc, iron (generally present in the zinc compound as zinc ferrite), and sulfate, sulfide, silicate and aluminate, each present in trace amounts to several percent by weight. It has been suggested that the iron can be extracted from the roasted blende by solubilizing it so that it is eliminated during the electrolytic process. The last-mentioned treatment involved the leaching of zinc blende with sulfuric acid in one or more steps, continuously or in batches.

However, considerable difficulty has been encountered because of the presence of these constituents which are always present in zinc blende and which tend to form zinc ferrites during roasting. The zinc ferrites are difficult to solubilize even in dilute sulfuric acid and hence complete recovery of zinc or even recovery of technologically sufficient zinc from zinc-containing materials of this type has been difficult if not impossible.

Other processes are also uneconomical because they require high capital expenditure for equipment and have insufficient yields of zinc. In some cases, the concentration of the acid must be so high that corrosion is the major problem and pressure-resisting, low-corrosivity vessels are required.

(3) OBJECTS OF THE INVENTION

It is, therefore, the principal object of the present invention to provide an improved method of recovering zinc, especially from oxidic materials containing same in the presence of iron, whereby the aforementioned disadvantages are obviated.

It is another object of this invention to provide an improved process for recovering zinc wherein low-cost equipment may be used with less danger of corrosive deterioration thereof than has characterized earlier techniques.

It is also an object of our invention to provide a method of separating or recovering zinc from iron-containing materials which provides the zinc in high yield with little contamination by iron.

(4) DESCRIPTION OF THE INVENTION

These objects and others which will become apparent hereinafter, are attained in accordance with the present invention, which is based upon our surprising discovery that it is possible using a leaching process maintained within certain critical and narrow parameter ranges, to eliminate the disadvantages of earlier systems. More particularly, the invention comprises the leaching of oxidic materials containing zinc and iron with an excess of hot sulfuric acid to form an extract which contains free sulfuric acid reducing the acidity of the extract by the addition of zinc-containing oxidic materials to precipitate iron, and adjusting the concentration of sulfuric acid and the temperature of the various steps within the aforementioned critical values. The zinc-containing and iron-containing oxidic materials, e.g. the ores, or concentrates and metallurgical residues of zinc-recovery processes are leached at a temperature of 95°–100° C. with a solution which contains 180 to 220 grams per liter (g./l.) $H_2SO_4$ (critical range) and in an amount in excess of the stoichiometric quantity in sulfuric acid necessary to form the sulfate with the iron and zinc. This excess is such that 20–60 g./liter $H_2SO_4$ remain in the extract; i.e. the leaching step is continued until the content of sulfuric acid in the extract has been reduced to 20 to 60 g./liter $H_2SO_4$ (critical range). According to an essential feature of this invention, alkali-metal ions and/or ammonium ions are then added to the extract which is subsequently treated with zinc-containing oxidic materials at a temperature of 95°–100° C. (critical range) until the sulfuric acid condensation of the resulting suspension is reduced below 10 g./liter $H_2SO_4$.

According to the principles of the present invenioint, the leaching agent consists of spent sulfuric acid electrolyte derived from the electrolytic production of zinc which contains, in addition to the indicated concentration of sulfuric acid (180 to 220 g./liter $H_2SO_4$) about 40 to 60 g./liter of zinc and 2 to 3 g./liter of manganese.

The leaching acid and the material which contains zinc and iron (starting material) may be progressively combined continuously or in increments under agitation and at the indicated temperature. Preferably, the solids are added to a bath of the leaching acid under stirring, the leaching acid having previously been heated to 95 to 100° C. The solids may be added continuously or in increments and the addition is continued with stirring until the sulfuric acid concentration has been reduced to 20 to 60 g./liter $H_2SO_4$.

Still another feature of this invention resides in the plural stage reduction of the concentration of $H_2SO_4$ in the leaching acid. In accordance with this feature, we combine the leaching acid with the solid material at such a rate that the sulfuric-acid content is lowered to 70 to 90 g./liter $H_2SO_4$ at an initial step at which digestion is permitted to proceed before additional quantities of the acid and solid materials are combined to bring the sulfuric-acid concentration to the aforestated level of 20 to 60 g./liter $H_2SO_4$.

We have found, moreover, that the use of an oxidizing agent, e.g. pyrolusite (manganese dioxide) in any concentration up to 5 g./liter, increases the effectiveness of the leaching operation. The residue which remains after the leaching step generally contains lead, silver, copper and silica and may be removed for recovery of these materials and to ensure that the basic iron sufate to be formed in subsequent precipitation does not contain inclusions of these metals. The solution decanted from the solid residue, contains free sulfuric acid in an amount of 20 to 60 g./liter $H_2SO_4$ together with 10 to 25 g./liter iron and 120 to 160 g./liter zinc. Alkali metal ions and/or ammonium ions are added to the solution in the amount necessary to produce a sulfate double salt with the iron upon precipitation by the addition of zinc-containing oxidic materials to the leaching solution or mother liquor. In effect, therefore, the alkali metal ions are ammonium ions, which may be supplied as salts (e.g. the sodium, potassium or ammonium sulfate) or as bases (e.g. the sodium, potassium, or ammonium hydroxide) are supplied in a molar quantity so as to form a compound of the general formula $NH_4Fe_3(SO_4)_2OH_6$ (jarosite), the latter being separated from the mother liquor and leaving the latter rich in zinc and substantially iron-free. This procedure has the advantage that the sulfate balance is maintained during the precipitation of iron in the form of jarosite which is, as noted a sulfate-containing mineral. Some amounts of sulfate are continuously added with the roasted-zinc blende, thereby tending to an increase in the sulfate concentration in the leaching electrolysis cycle if sulfate is not removed e.g. in the form of jarosite. Precipitation of the iron is carried out to reduce the iron concentration in the solution well below 1 g./liter Fe and it has been found that further quantities of iron can be precipitated to reduce the residual concentration to a few mg./liter if the acidity is reduced further by bringing the solution to a pH of 3.3 to 4.0. We have found it advantageous to add the zinc-oxide material in the form of roasted zinc blende. Zinc oxide may, however, be employed directly for this purpose. The solution (mother liquor) formed upon the precipitation of iron is supplied to an electrolytic process for the recovery of zinc (see pages 1182 ff of the Encyclopedia of Electrochemistry, Reinhold Publishing Corporation 1964.

(5) SPECIFIC EXAMPLES

Example I 105 cubic meters of spent zinc electrolysis acid containing 180 g./liter $H_2SO_4$, 2 to 3 g./liter manganese and 40 to 60 g./liter zinc, is heated in a leaching tank. Twelve metric tons of roasted zinc blende (60.7% by weight zinc, 9.7% by weight iron and sulfate, sulfides, silicate and aluminate constituting together with oxidic oxygen the balance) are charged into the tank over a period of 20 minutes, the system being permitted to digest at 95 to 100° C. for a period of 2 hours. After this time, the acid content was evaluated and found to be 70 g./liter $H_2SO_4$, whereupon 2.5 metric tons of roasted blende was added. Within an hour, the sulfuric-acid concentration was 39 g./liter.

Ammonium hydroxide ($NH_3$ in the form of ammonia water) was added in the amount stoichiometrically required for precipitation of the iron and 3.5 metric tons of additional roasted blende was added over a period of 3.5 hours in seven equal increments. The concentration was 6 g./liter $H_2SO_4$. A final pH value of 3.3 was adjusted by the addition of roasted blende (0.87 metric ton) over a period of 0.8 hour. When the filtered solution was separated from the solid residue, the latter was found to contain 11.0% by weight zinc and 29.8% by weight iron. The solution obtained contained 150 g./liter of zinc. This electrolyte containing only a few mg./liter of iron, is supplied to an electrolysis cell operated at 3.4 volts to electrolytically deposit the zinc. The depleted electrolyte is recycled to the process of the present invention.

Example II 110 cubic meters of spent zinc electrolysis acid containing 180 g./liter $H_2SO_4$ were heated in a leaching tank to 95 to 100° C. and 15.5 metric tons of roasted blende (59.5% by weight zinc and 10.1% by weight iron) was supplied over a period of 30 minutes. The acidity was found to be 52 g./liter $H_2SO_4$ after 4.5 hours and ammonia in the form of ammonia water was added. The filtered residue, after a further reaction time of 4 hours, during which 4.3 metric tons of zinc blende was added, was found to be 10.2% zinc, and 28.3% iron, corresponding to a yield of zinc of 93.9%. In this case, as in Example I, roasted zinc blende constituted the zinc-containing oxide material used in the precipitation stage. When pure zinc oxide was substituted in the stoichiometrically equivalent quantity to the roasted zinc blende of the final stages of Examples I and II, similar results were obtained; identical results were obtained when, in place of the ammonia water, sodium hydroxide or carbonate was employed in the stoichiometrically equivalent quantity. Best results were obtained when small amounts of pyrolusite were added during leaching.

We claim:

1. A method of recovering zinc, comprising the steps of treating a raw oxidic material containing zinc and iron with sulfuric acid at a concentration of 180 to 220 g./liter $H_2SO_4$ and at a temperature of 95 to 100° C. in a stoichiometric excess of the sulfuric acid to produce a liquid phase containing sulfuric acid at a concentration of 20 to 60 g./liter $H_2SO_4$ and at least the major part of the zinc and iron of said material; and adding alkali-metal or ammonium ions to said liquid phase and precipitating an iron-containing compound therefrom by the addition of an oxidic substance containing zinc at a temperature of 95 to 100° C. of the liquid phase in an amount sufficient to reduce the acid concentration thereof below 10 g./liter $H_2SO_4$.

2. The method defined in claim 1 wherein said material is added to a bath of said sulfuric acid progressively.

3. The method defined in claim 1 wherein sulfuric acid and said material are supplied simultaneously and progressively to a container for treatment of said material with the sulfuric acid.

4. The method defined in claim 1, further comprising the step of initially reducing the sulfuric-acid content of said liquid phase to 70 to 90 g./liter $H_2SO_4$ by restricting the amount of said material and thereafter increasing said amount of said material to bring the sulfuric acid concentration of said liquid phase within said range of 20 to 60 g./liter $H_2SO_4$.

5. The method defined in claim 1, further comprising the step of carrying out the treatment of said material with said sulfuric acid in the presence of pyrolucite.

6. The method defined in claim 1, further comprising the step of separating said liquid phase from any solid residue prior to the addition of the alkali metal or ammonium ion thereto.

7. The method defined in claim 6, further comprising the step of adjusting the pH of the liquid phase to 3.3 to 4.0.

8. The method defined in claim 7 wherein the pH is adjusted by the addition of zinc oxide to the liquid phase.

9. The method defined in claim 7, wherein said material and said substance are both roasted zinc blend further comprising the step of removing zinc from said liquid phase by electrolysis.

References Cited

UNITED STATES PATENTS

| 3,493,365 | 2/1970 | Pickering et al. | 75—120 |
| 3,434,798 | 3/1969 | Menendez et al. | 75—120 |

JOHN H. MACK, Primary Examiner

R. L. ANDREWS, Assistant Examiner

U.S. Cl. X.R.

75—120